(12) United States Patent
Jenner et al.

(10) Patent No.: US 6,385,382 B1
(45) Date of Patent: May 7, 2002

(54) ALIGNMENT SYSTEM OPTICAL COMPONENT INTERFACE

(75) Inventors: Robert K. Jenner, Atkinson, NH (US); Peter S. Whitney; Dale C. Flanders, both of Lexington, MA (US); Thomas D. Williams, Waltham, MA (US)

(73) Assignee: Axsun Technologies, Inc., Billerica, MA (US)

(*) Notice: Subject to any disclaimer, the term of this patent is extended or adjusted under 35 U.S.C. 154(b) by 7 days.

(21) Appl. No.: 09/689,349

(22) Filed: Oct. 12, 2000

(51) Int. Cl.$^7$ ............................. G02B 7/00; G02B 6/54
(52) U.S. Cl. ................ 385/137; 385/137; 269/254 R; 269/903
(58) Field of Search ................ 385/136, 137; 269/254 R, DIG. 903

(56) References Cited

U.S. PATENT DOCUMENTS

| | | | | |
|---|---|---|---|---|
| 4,877,228 A | * | 10/1989 | Ripert ..................... 269/156 |
| 5,395,101 A | * | 3/1995 | Takimoto et al. ............ 269/25 |
| 5,677,975 A | * | 10/1997 | Burek et al. ............... 385/136 |
| 6,085,014 A | * | 7/2000 | Kajiwara ................... 385/137 |
| 6,266,471 B1 | * | 7/2001 | Burek et al. ............... 385/136 |

* cited by examiner

Primary Examiner—Brian Sircus
Assistant Examiner—Michael C. Zarroli
(74) Attorney, Agent, or Firm—Grant Houston (57) ABSTRACT

A mechanical interface between a manipulation system and an optical component in which manipulation system jaws are adapted to engage an optical component at a handle and then deform the component. In some applications, an optical component is translationally or rotationally deformed. In one example, the jaws are moved towards each other in an opposed fashion such that teeth engage the optical component at the handle. Then, the jaws are collectively actuated so that they are moved in substantially the same direction. This results, typically, in the deformation of the optical component so that the optical element held by the optical mounting structure is moved into an improved alignment position. In another example, a V-shaped slot in one of the jaws is used to grasp the optical element, e.g., fiber, to move the element.

18 Claims, 7 Drawing Sheets

ALIGNMENT SYSTEM OPTICAL COMPONENT INTERFACE

BACKGROUND OF THE INVENTION

Component alignment is of critical importance in microoptical systems and especially semiconductor and/or MEMS (micro-electromechanical systems) based optical system manufacturing. The basic nature of light requires that light generating, transmitting, and modifying components must be positioned accurately with respect to one another, especially in the context of free-space-interconnect optical systems, in order to function properly and effectively. Scales characteristic of optical semiconductor and MEMS technologies can necessitate micron to sub-micron alignment accuracy.

Consider the specific example of coupling light from a semiconductor diode laser, such as a pump or transmitter laser, to a core of a single mode fiber. Only the power that is coupled into the fiber core is usable, and the coupling efficiency is highly dependent on accurate alignment between the laser output facet and the core; inaccurate alignment can result in partial or complete loss of signal transmission through the optical system. Moreover, if polarization-maintaining fiber is used, there is an added need to rotationally align the fiber relative to the laser to maintain the single polarization characteristic of the output signal.

Other more general examples include optical amplification, receiving and/or processing systems. Some alignment is typically required between an optical signal source, such as the fiber endface, and a detector. In more complex systems, including tunable filters, for example, alignment is required not only to preserve signal power but also to yield high quality or high finesse systems through the suppression of undesirable optical modes within and without the systems.

Generally, there are two types of alignment strategies: active and passive. Typically in passive alignment of the optical components, registration or alignment features are fabricated directly on the optical elements or element mounting structures as well as on the platform to which the components are to be mounted. The components are then mounted and bonded directly to the platform using the alignment features. In active alignment, an optical signal is transmitted through the components and detected. The alignment is performed based on the transmission characteristics to enable the highest possible performance level for the system.

In the context of commercial volume manufacturing, selection between active and passive alignment, or some mix of the two, is determined based on the quality of part needed. Lower cost, lower performance devices are typically manufactured with entirely passive alignment strategies, whereas the manufacture of high performance devices typically involves at least some active alignment.

SUMMARY OF THE INVENTION

There is thus a need in optical system manufacture for the precise manipulation of optical components relative to the substrate on which, and/or module in which, they are installed. Such manipulation includes the placement, attachment, and any subsequent positional modification to achieve the specified level of alignment. These needs transcend the specific classes of alignment strategies: active and passive.

In general, according to one aspect, the invention concerns a mechanical interface between a manipulation system and an optical component. This interface comprises a handle feature formed in the optical component. This feature includes two opposed depressions in the optical component, in one embodiment. The alignment system has jaws adapted to engage the optical component at the handle in these depressions.

In specific embodiments, the depressions comprise slots that extend along the width or longitudinal length of the optical component. Presently, V-shaped slots are used.

In the preferred embodiment, the jaws each comprise an engagement tooth that has a length greater than the depth of the corresponding depression. In the preferred embodiment, the depressions are located at essentially the same height on the optical component relative to a bench, on which the optical component is installed.

According to one modification, at least one of the jaws comprises a slot for engaging an optical element, such as an optical fiber. The optical element can be installed or positioned upon the mounting structure of the optical component by the manipulation system.

In general, according to another aspect, the invention can also be characterized as a process for engaging and manipulating an optical component with a manipulation system. This process comprises closing jaws of the manipulation system to insert respective jaw teeth into depressed portions of a handle feature of the optical component, for example. The jaws are collectively actuated to manipulate the optical component relative to a bench on which the optical component is installed or another optical component.

Typically, the step of closing the jaws comprises moving the jaws toward each other to engage the optical component between the jaws. After engagement, the jaws can be moved in substantially the same direction, in tandem, to deform the optical component. In another mode of operation, the jaws are moved in counter directions relative to each other. This results in the rotation of an optical element installed on the optical component.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
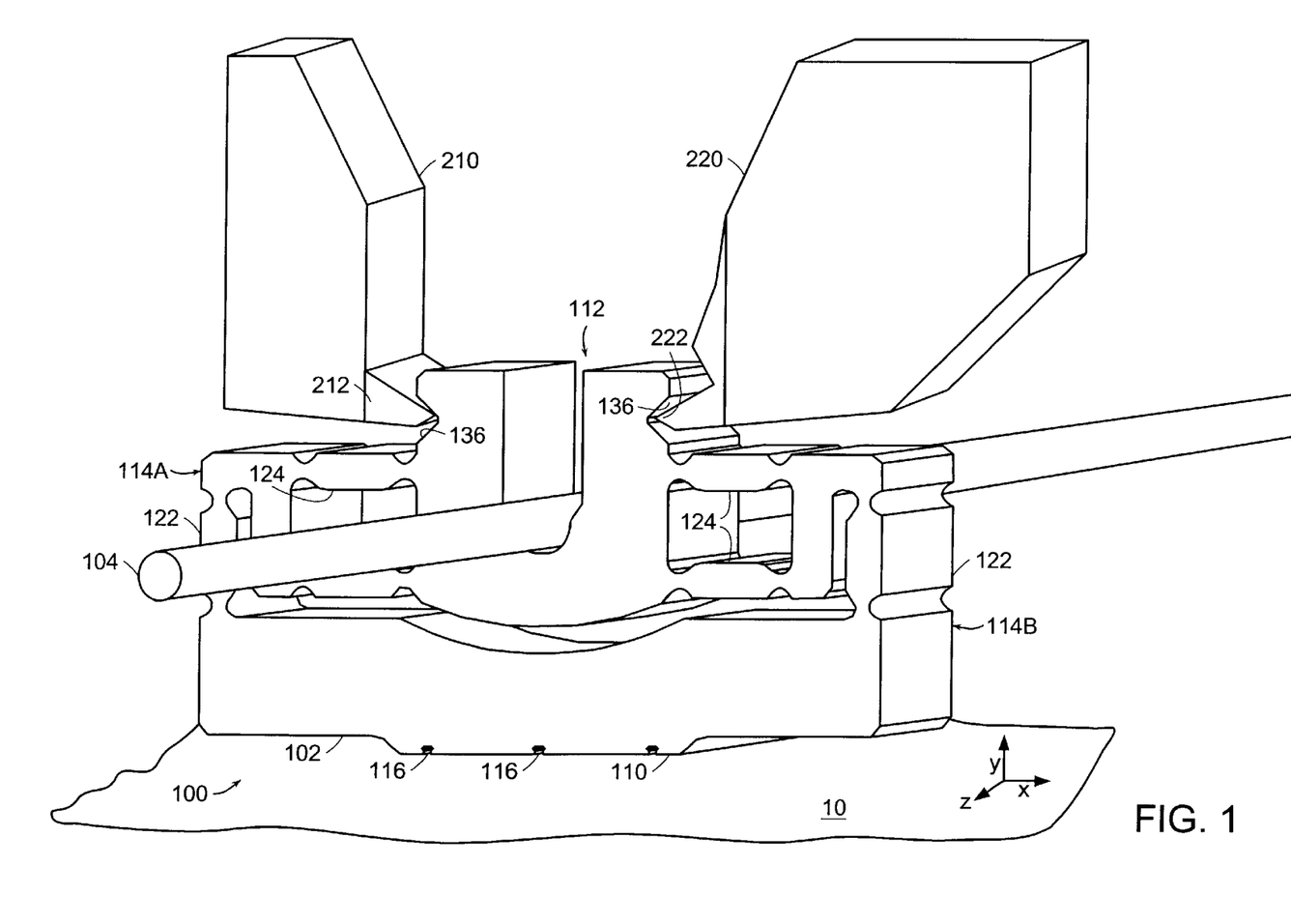
FIG. 1 is a perspective view showing the jaws of an alignment system engaging an optical component, and thus the component-alignment system interface according to the present invention.

FIG. 1 shows the interface between jaws of an alignment system and an exemplary optical component, which interface has been constructed according to the principles of the present invention.

The alignment system is generally described in pending U.S. patent application Ser. No. 09/667,186, filed on Sept. 21, 2000, entitled Optical System Manufacturing and Alignment System, by Robert K. Jenner, et al., the contents of which are incorporated herein in their entirety by this reference.

The optical component 100 comprises a mounting structure 102 and an optical element, which in this illustrated example is an optical fiber 104.

The mounting structure comprises a base 110, an optical element interface 112, and left and right armatures 114A, 114B, which either directly connect, or indirectly connect, the base 110 to the element interface 112.

The base 110 comprises a laterally-extending base surface. In the illustrated example, the base surface 110 extends in a plane of the x and z axes, generally.

The base/base-surface comprise alignment features 116. In some embodiments, these features are adapted to mate with preferably opposite-gendered alignment features of an optical bench 10. In the specific illustrated implementation, the alignment features are used by machine vision systems to match to alignment marks or features of the bench 10.

In the illustrated implementation, each of the armatures 114A, 114B comprises two segments. The vertically-extending segments 122, i.e., extending at least partially in the y-axis direction, have two flexures along their length, in the illustrated embodiment. These flexures are regions of reduced cross-sectional area in the segments, which regions extend in the direction of the z-axis. The vertically-extending segments 122 facilitate the positioning of the optical element 104 along the x-axis; the flexures facilitate the pivoting of the segments in a plane of the x and y axes. A purpose of the flexures is to isolate regions of microstructural change, such as occurring in plastic deformation, in order to make the yield forces, for example, readily predictable. Also, the flexures localize deformation on the armatures and consequently decrease the amount of force/movement required in the optical component before plastic deformation is initiated in the armature.

Horizontally-extending (i.e., extending in the direction of the x-axis) segments 124 each comprise upper and lower parts that extend between the vertically-extending segments 122 and the material forming the element interface 112. In the illustrated embodiment, two flexures are found on each part.

The horizontally-extending segments 124 allow the positioning of an optical element, generally vertically along the y-axis. Armature deformation is facilitated by respective flexures.

In one implementation, the optical element is bonded to the optical element interface 112, and specifically a bonding surface. This bonding is accomplished either through polymeric adhesive bonding or preferably solder bonding. In other implementations, thermocompression bonding, laser welding, reactive bonding or other bonding methods are used.

The optical element interface, in some other implementations, comprises a port for enabling an optical signal to pass transversely through the structure. This enables optical access to the optical element of the component by facilitating the propagation of an optical signal to and/or away from the element.

To facilitate the grasping and placement of the structure 100, a handle 36 is also preferably provided on the structure. In the illustrated embodiment, the handle 136 comprises two v-shaped cut out regions on either side, near the top of the structure. In the illustrated example, they are integral with the optical element interface 112. In other embodiments, rather than depressions, projection-type features form the handle.

Figure 2:
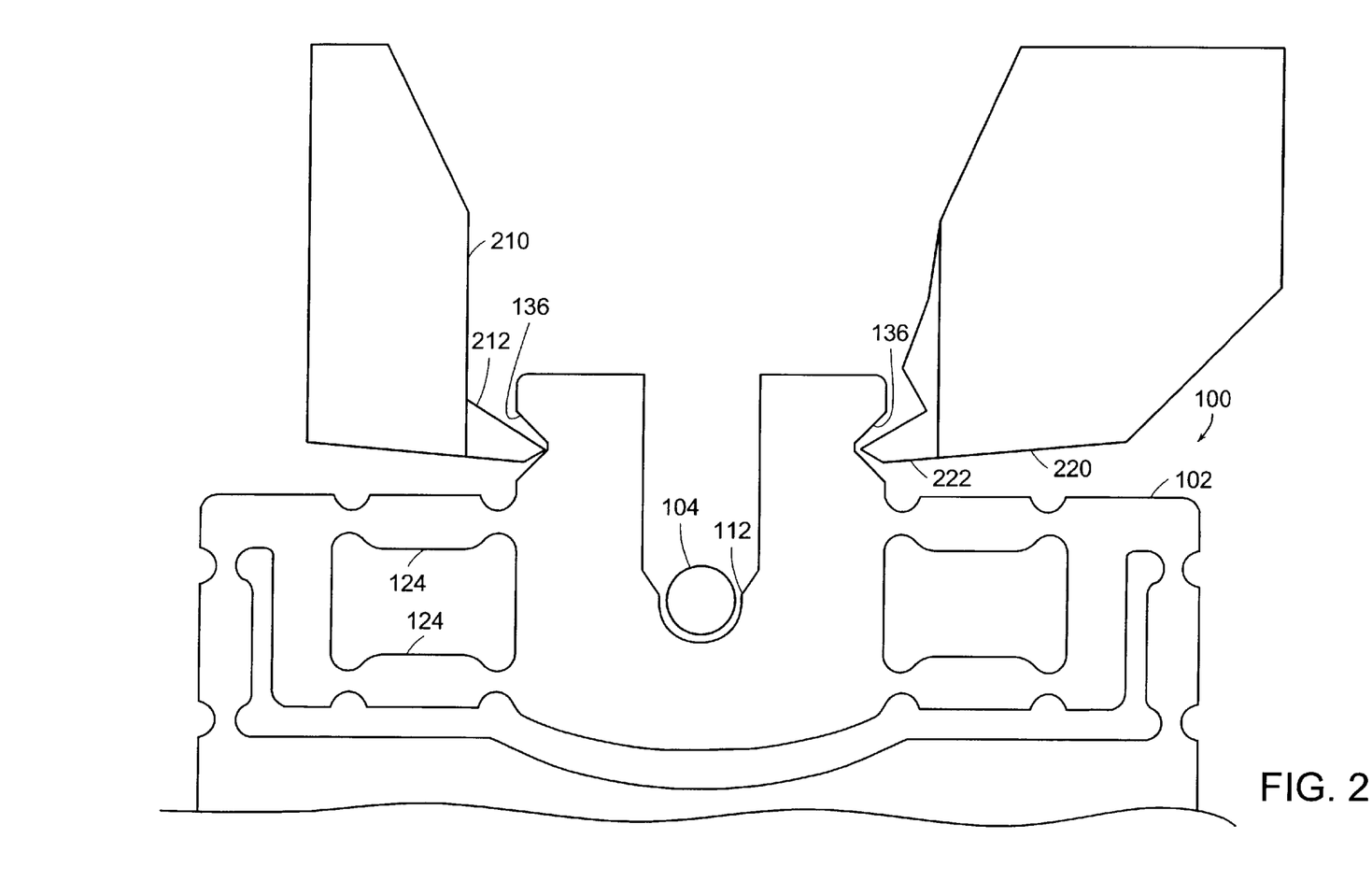
FIG. 2 is a close-up elevation view of the alignment system engaging an optical component illustrating the inventive component-alignment system interface.

The handle features 136 enable the manipulation of the component 100 when attached to the bench 10. This manipulation is performed by an alignment system that comprises left and right jaws 210, 220. These jaws engage at the optical component 100 at the handle 136 in an opposed fashion. Specifically, when using depression-type handle features, teeth 212, 222 of the respective jaws 210, 220 are inserted into the V-shaped depressions of the handle to engage the depressions near the bottom of the V-shape. Specifically, the right cut-out is engaged to displace the component to the left, for example. To displace the structure vertically or in the y-axis direction, both cut-outs are engaged simultaneously, enabling the structure to be pressed down toward the bench 10 or pulled away from the bench. FIG. 2 shows, in greater detail, the mechanical interface between the alignment or manipulation system jaws 210, 220 and the handle feature 136 of the optical component 100. Specifically, as shown, the teeth 212, 222 of the jaws have a length greater than the depth of the corresponding depression of the handle 136 such that the teeth can reach into the depression and engage the optical component at the base of the depression. Further, in order to facilitate grasping of the optical component without any incidental rotational moment, the handle features 136 are located at substantially the same distance from the base 110 of the optical component and consequently, the bench to which the component is attached.

Figure 3:
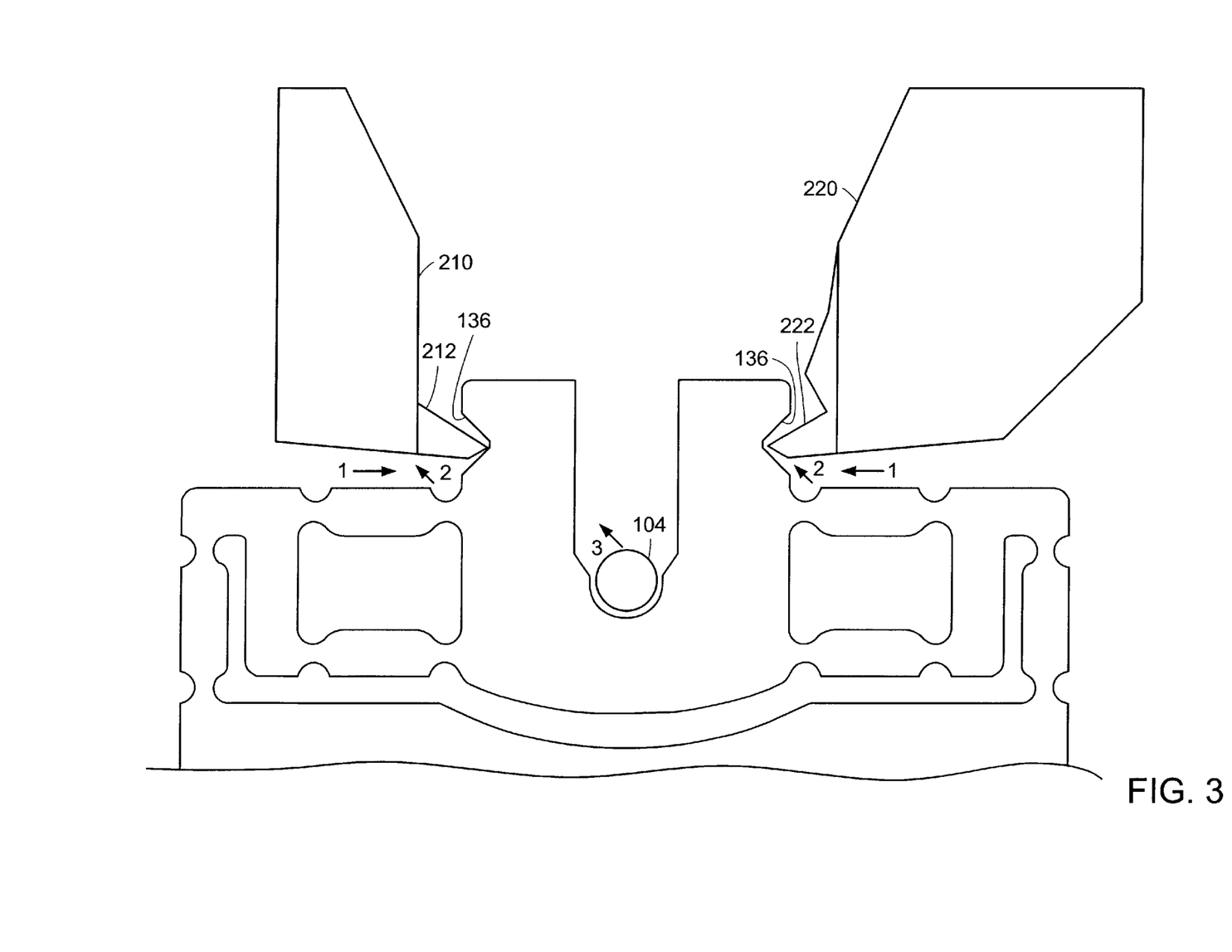
FIG. 3 is an elevation view of the interface that illustrates the opposed movement of the jaws to engage the optical component followed by the tandem movement to deform the mounting structure of the optical component.

FIG. 3 illustrates the engagement and manipulation of the optical component 100 by the manipulation system. Specifically, in a step one of the process, the jaws 210, 220 are moved towards each other in an opposed fashion such that the teeth 212, 222 engage the optical component 100 at the handle 136 as illustrated by arrows 1. Then, the jaws 210, 220 are collectively actuated so that they are moved in substantially the same direction as illustrated by arrows 2. This results, typically, in the deformation of the optical component so that the optical element 104 held by the optical mounting structure 102 is moved into an improved alignment position as illustrated by arrow 3.

Figure 4:
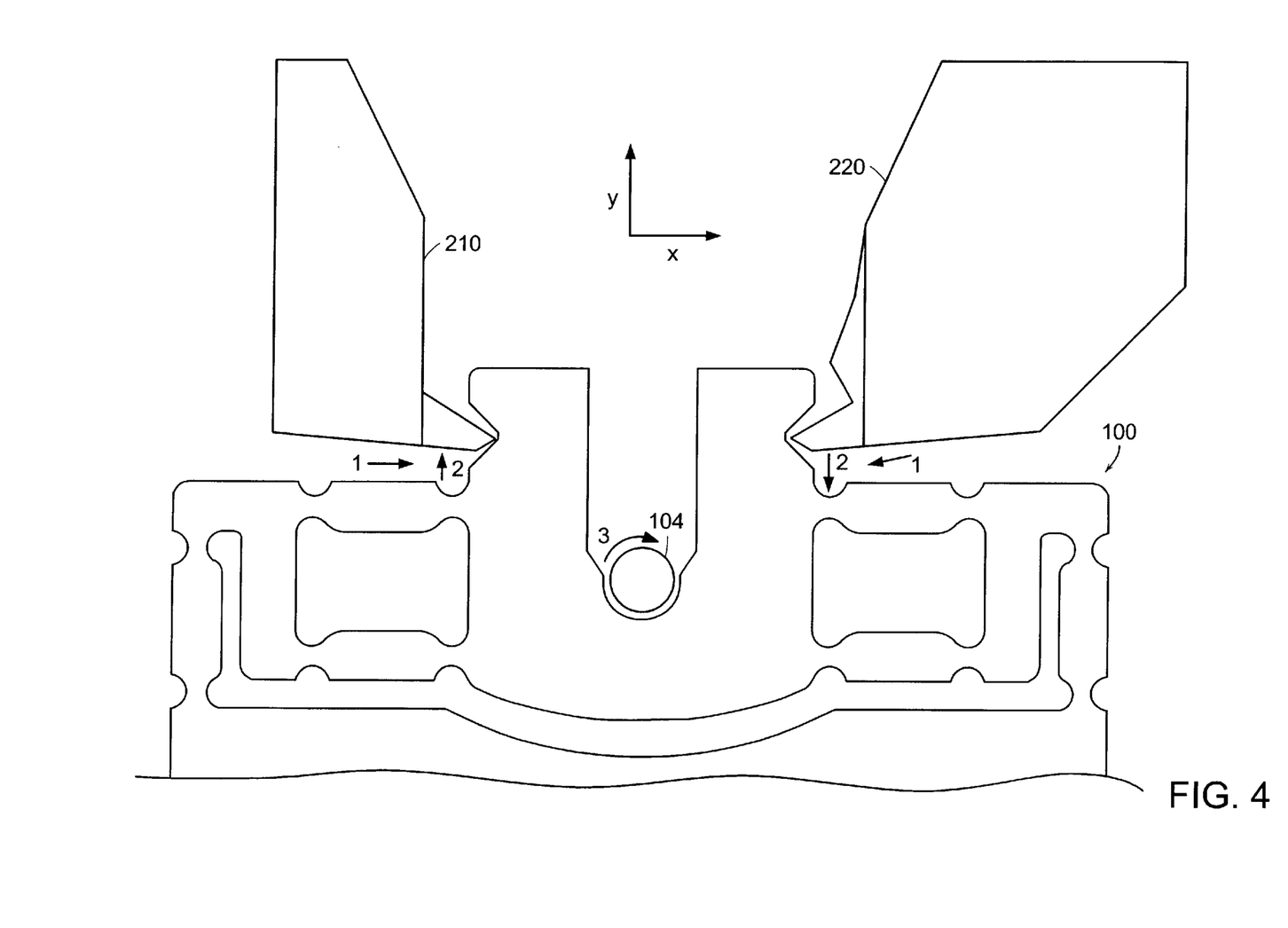
FIG. 4 is an elevation view of the interface that illustrates the opposed movement of the jaws to engage the optical component followed by the tangential movement to deform the mounting structure and thus rotationally align the optical element.

In an alternative alignment process, illustrated in FIG. 4, the jaws are again moved in an opposed fashion as illustrated by the arrows of step 1 to engage the optical component 100. Thereafter, as indicated by arrows of step 2 in FIG. 4, the jaws are moved in counter directions, tangentially to a circle coaxial with an optical axis of the optical element 104. For example, in the illustrated embodiment, jaw 210 is moved in a positive y axis direction whereas jaw 220 is moved in a negative y axis direction. In one specific embodiment, they are moved the same distances, but in opposite directions. This results in the rotational alignment of the optical element 104 as illustrated by arrow 3.

Figure 5:
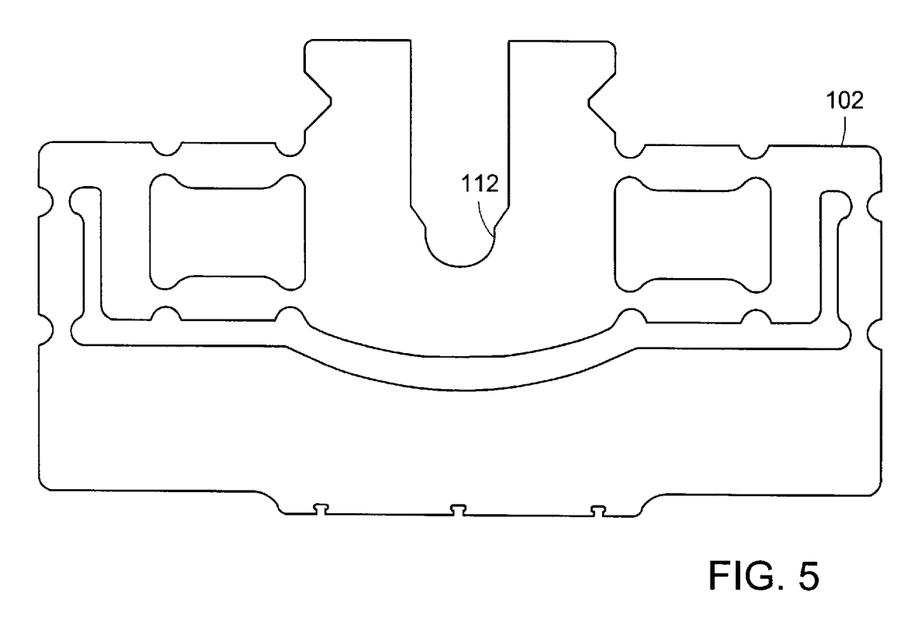
FIG. 5 is an elevation view of the alignment system manipulating an optical fiber before installation on a mounting structure to form the optical component.

FIG. 5 illustrates still another mode of operation of the alignment system in which a V-shaped slot 224 in one of the jaws, e.g., 220, is used to grasp the optical element, e.g., fiber 104, to move the element. Specifically, in one mode of operation, the jaws are used to insert the fiber 104 onto or manipulate the fiber relative to the optical component interface 112 of the mounting structure 102.

Figure 6:
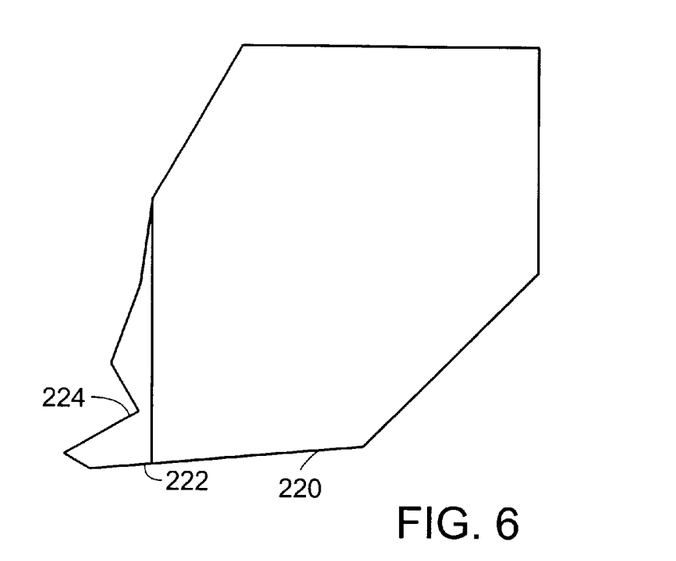
FIG. 6 is a close-up elevation view of the right jaw of the alignment system.
Figure 7:
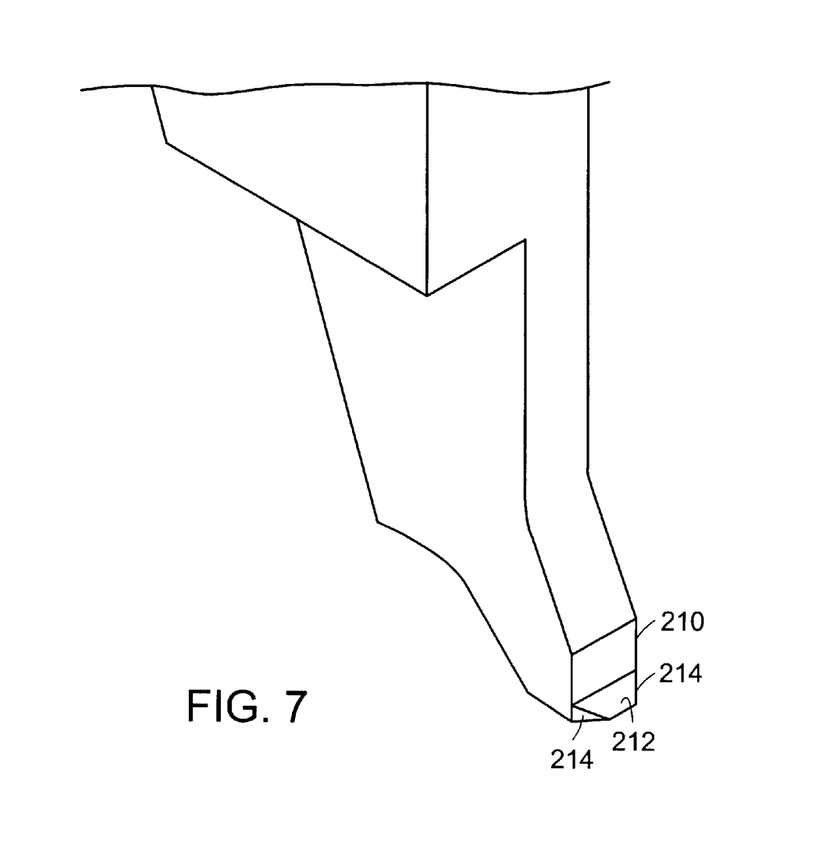
FIG. 7 is a close-up perspective view of the left jaw of the alignment system.
Figure 8:
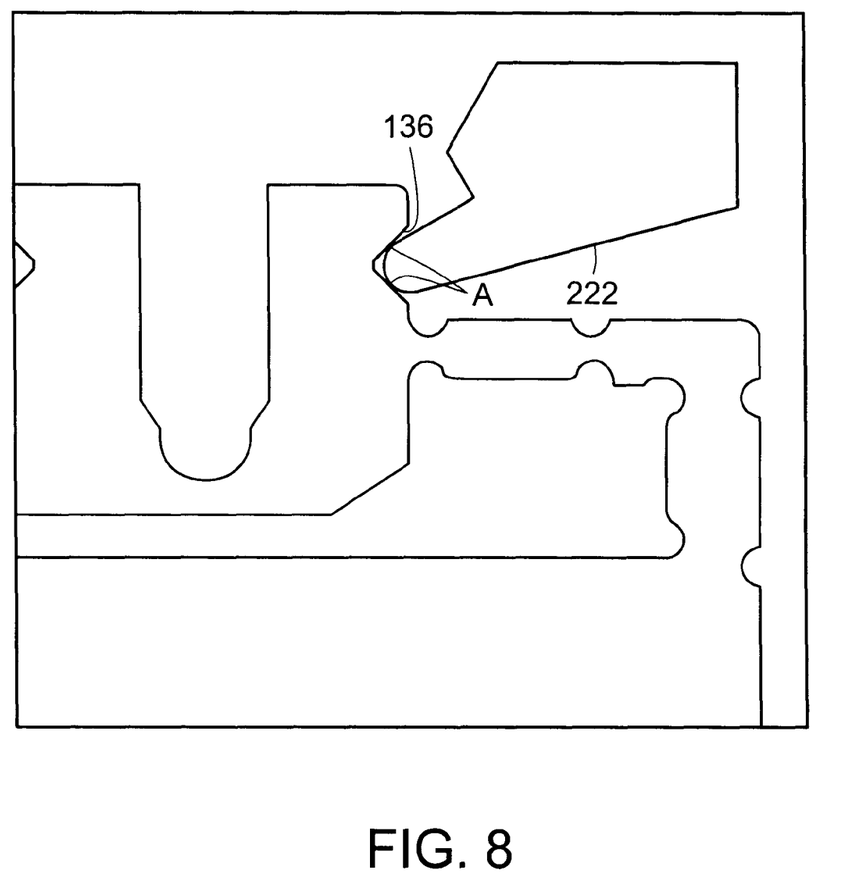
FIG. 8 is a close-up elevation view of the right jaw of the alignment system and its engagement of the handle feature.

FIG. 6 is a detailed view showing the jaw slot 224 formed above the tooth 222 of the right jaw 220. FIG. 7 shows details of the left jaw 212. Specifically, it shows the jaw in perspective further illustrating cheek portions 214 that taper the tooth in the z-axis direction to minimize the area of contact between the jaw and the optical component to reduce any torquing on the optical component as it is initially grasped. In one embodiment, a two-point contact is used in the interface between each jaw and the respective depressions of the handle, as illustrated by arrows A of FIG. 8.

While this invention has been particularly shown and described with references to preferred embodiments thereof, it will be understood by those skilled in the art that various changes in form and details may be made therein without departing from the scope of the invention encompassed by the appended claims.

What is claimed is:

1. A mechanical interface between a manipulation system and an optical component, comprising:
  a handle feature including depressions formed in the optical component; and
  manipulation system jaws adapted to engage the optical component at the handle in the depressions, wherein at least one of the jaws comprises a slot for engaging an optical element for installation on a mounting structure of the optical component.

2. A mechanical interface as claimed in claim 1, wherein the handle feature comprises two opposed depressions along a longitudinal length of the optical component.

3. A mechanical interface as claimed in claim 2, wherein the depressions extend along a longitudinal length of the optical component.

4. A mechanical interface as claimed in claim 2, wherein each jaw comprises an engagement tooth having a length greater than a depth of the corresponding depression of the optical component.

5. A mechanical interface as claimed in claim 2, wherein the depressions are located the same distance from a plane of a bottom surface of the optical component.

6. A mechanical interface as claimed in claim 2, wherein the depressions are formed adjacent to an optical element interface of the optical component.

7. A process for engaging and manipulating an optical component with a manipulation system, the process comprising:
  closing jaws of the manipulation system to insert respective jaw teeth into depressed portions of a handle feature of the optical component by moving the jaws toward each other to engage the optical component between the jaws; and
  collectively actuating the jaws to manipulate the optical component relative to a bench on which the optical component is installed.

8. A process as claimed in claim 7, wherein the step of collectively actuating the jaws comprises moving the jaws in substantially the same direction to deform the optical component.

9. A process as claimed in claim 7, wherein the step of collectively actuating the jaws comprises moving the jaws in a plane that is orthogonal to the bench to deform the optical component.

10. A process for engaging and manipulating an optical component with a manipulation system, the process comprising:
  closing jaws of the manipulation system to insert respective jaw teeth into depressed portions of a handle feature of the optical component; and
  collectively actuating the jaws to manipulate the optical component relative to a bench on which the optical component is installed by moving the jaws in counter directions relative to each other to deform the optical component such that an optical element of the optical component is rotated.

11. A process for engaging and manipulating an optical component with a manipulation system, the process comprising:
  closing jaws of the manipulation system to insert respective jaw teeth into depressed portions of a handle feature of the optical component; and
  collectively actuating the jaws to manipulate the optical component relative to a bench on which the optical component is installed by moving the jaws in counter directions to deform the optical component such that an optical element of the optical component is rotated in a plane that is orthogonal to the bench.

12. A process as claimed in claim 7, wherein the depressions comprise slots extending along a longitudinal length of the optical component.

13. A process as claimed in claim 7, wherein the depressions comprise v-shaped slots.

14. A process as claimed in claim 7, wherein each jaw comprises an engagement tooth having a length greater than a depth of the corresponding depression of the optical component.

15. A process as claimed in claim 7, wherein the depressions are located the same distance from a plane of a bottom surface of the optical component.

16. A process for engaging and manipulating an optical component with a manipulation system, the process comprising:
  engaging an optical element with jaws of the manipulation system and installing an optical element on a mounting structure portion of the optical component;
  closing the jaws of the manipulation system to insert respective jaw teeth into depressed portions of a handle feature of the optical component; and
  collectively actuating the jaws to manipulate the optical component relative to a bench on which the optical component is installed.

17. A process for engaging and manipulating an optical component with a manipulation system, the process comprising:
  closing jaws of the manipulation system to insert respective jaw teeth into depressed portions of a handle feature of the optical component; and
  collectively actuating the jaws to manipulate the optical component relative to a bench on which the optical component is installed by moving the jaws tangentially to a circle that is coaxial with an optical axis of an optical element to rotate the optical element.

18. A process for engaging and manipulating an optical component with a manipulation system, the process comprising:

closing jaws of the manipulation system to engage a handle feature of the optical component by moving the jaws toward each other to engage the optical component between the jaws; and collectively actuating the jaws to manipulate the optical component relative to a bench on which the optical component is installed.

* * * * *